N. LOGAN & H. P. HANSON.
CATTLE STANCHION.
APPLICATION FILED AUG. 15, 1912.
1,059,177.
Patented Apr. 15, 1913.
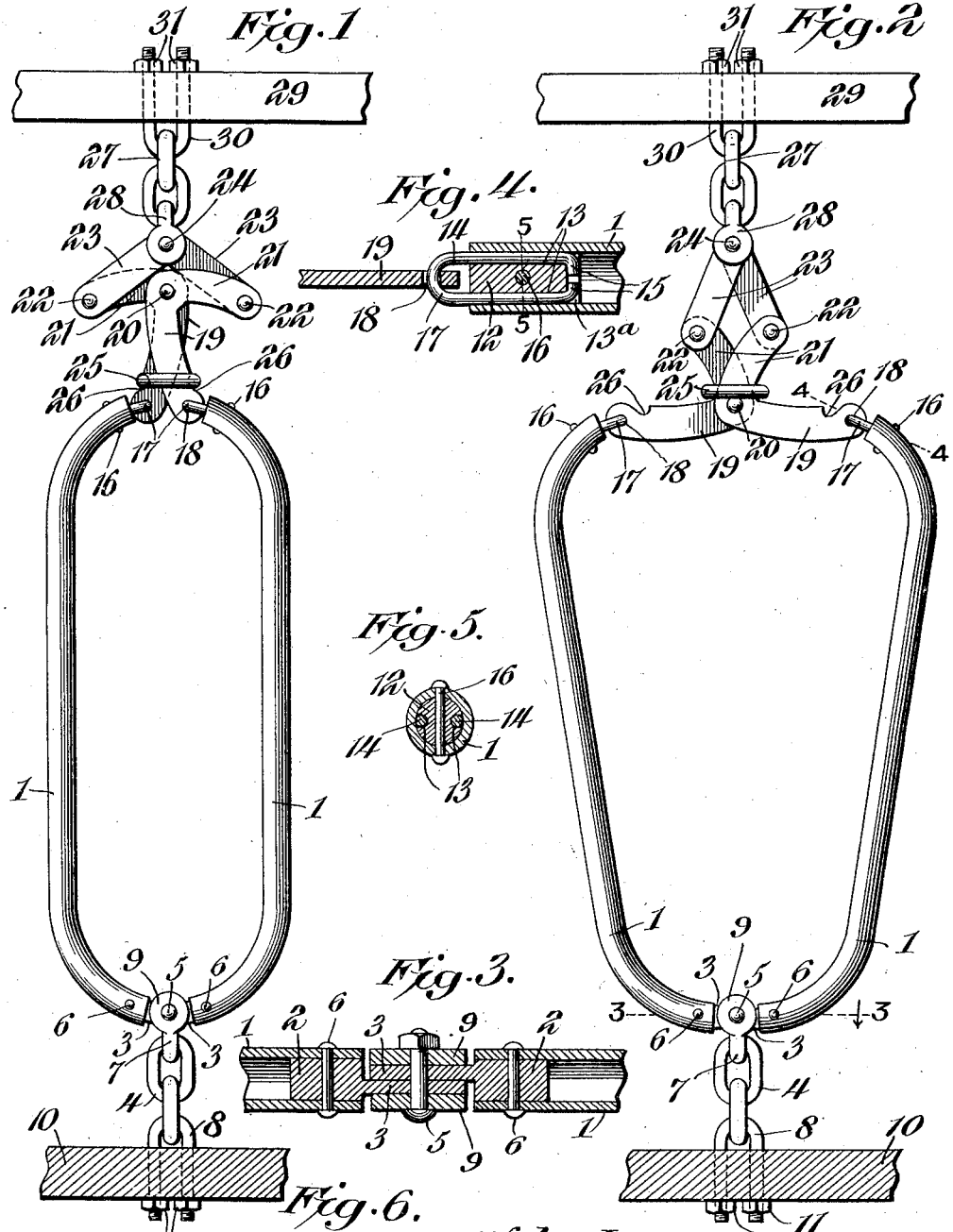

UNITED STATES PATENT OFFICE.

NELS LOGAN AND HAAKON P. HANSON, OF ALBERT LEA, MINNESOTA; SAID LOGAN ASSIGNOR TO SAMUEL L. HANSON, OF ALBERT LEA, MINNESOTA.

CATTLE-STANCHION.

1,059,177.   Specification of Letters Patent.   Patented Apr. 15, 1913.

Application filed August 15, 1912.   Serial No. 715,222.

*To all whom it may concern:*

Be it known that we, NELS LOGAN and HAAKON P. HANSON, citizens of the United States, residing at Albert Lea, in the county of Freeborn and State of Minnesota, have invented a new and useful Cattle-Stanchion, of which the following is a specification.

The invention relates to improvements in cattle stanchions.

The object of the present invention is to improve the construction of cattle stanchions, and to provide a simple and inexpensive cattle stanchion of strong and durable construction, equipped with hinged or pivoted sides or members adapted to open and close and connected by means capable of maintaining the same in an open position without the use of springs, and adapted also to permit the same to be easily and quickly closed and securely locked.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation partly in section of a cattle stanchion, constructed in accordance with this invention and shown closed. Fig. 2 is a similar view, the stanchion being open. Fig. 3 is a detail sectional view on the line 3—3 of Fig. 2. Fig. 4 is a similar view on the line 4—4 of Fig. 2. Fig. 5 is a detail sectional view on the line 5—5 of Fig. 4. Fig. 6 is a detail perspective view of one of the upper plugs.

Like numerals of reference designate corresponding parts in all the figures of the drawing.

In the accompanying drawing in which is illustrated the preferred embodiment of the invention, the cattle stanchion comprises in its construction two oppositely bowed sides or members 1, constructed of tubular metal, or other suitable material and equipped at their lower ends with round plugs 2, provided with overlapped ears 3 pivoted together and to a lower flexible connection 4 by a bolt 5. The ears 3 project from the lower terminals of the sides or members 1, and the plugs, which are fitted in the said lower ends, are secured to the same by transverse rivets 6, or other suitable fastening devices, which pierce the sides or members and the plugs. The flexible connection consists of a short chain provided at its upper end with an approximately U-shaped link or clevis 7 and having a staple 8 at its lower end. The link or clevis 7 is provided at opposite sides with ears 9, spaced apart to receive the ears 3 of the lower plugs 2 and provided with perforations through which the bolt 5 passes, whereby the sides or members of the stanchion are pivotally connected with the lower flexible connection. The staple 8 pierces the floor 10, or other fixed portion of the barn or inclosure in which the stanchion is installed, and its sides have threaded terminals for the reception of nuts 11.

The tubular sides or members are provided at their upper ends with round plugs 12, fitted within the tubular sides or members and provided at opposite sides with longitudinal grooves 13, which are connected at their inner ends by a central transverse groove 13$^a$. The grooves 13 of each upper plug receive the sides of an oblong link 14, provided with inwardly extending terminals 15 located at the inner end of the link 14 and arranged within the transverse groove 13$^a$ of the upper plug. The upper plug is secured within the tubular sides or members by means of a rivet 16, which pierces the part at a point between the sides of the link 14.

The links 14 project beyond the hinged sides or members 1 to form eyes 17, which are linked into perforations 18 of lower arms 19 of angle or bell crank levers, which are pivoted together at their angles by a rivet 20, or other suitable fastening device. When the stanchion is closed, as illustrated in Fig. 1, the lower arms 19 of the bell crank levers are arranged in an approximately vertical position, and the other arms 21 of the said levers extend outwardly in opposite directions in the same plane as the stanchion and are pivoted by rivets 22 to straight links 23, which are pivoted together at their upper ends by a rivet 24, or other suitable fastening device. The lower arms 19 are slightly curved in opposite directions, and their lower terminals are located at opposite sides of the median line of the stanchion when the latter is closed, so that the pivotal connections between the lower arms 19 of the levers and the sides of the standards do not contact or interfere with each other in the opening and closing movements of the stanchion. The upper arms 21 are also slightly curved, and the links 23 diverge downwardly and coact with the upper arms 21 of the bell crank levers to form a toggle. When the stanchion is open, the lower arms 19 swing outwardly and the bell crank levers move downwardly, while the links 23 swing inwardly. The lower arms of the bell crank levers are arranged in approximately a horizontal position when the stanchion is open and extend across the top of the same, and the hinged sides or members 1 are maintained in their open position by the bell crank levers and without the aid of a spring, which is usually employed for this purpose.

The stanchion is closed by raising the bell crank levers and causing their lower arms to swing inwardly and their upper arms to swing outwardly, and the stanchion is automatically locked in its closed position by means of an oblong link or locking member 25, arranged on the bell crank levers and adapted to slide down the lower arms into engagement with shouldered notches 26. When the link or ring 25 is disengaged from the notches 26, the bell crank levers will drop and the stanchion will open automatically through the action of gravity. In the opening movement, the locking link or ring 25 passes over the pivot to the upper arms of the bell crank levers, as clearly shown in Fig. 2 of the drawing.

The toggle locking and operating device formed by the bell crank levers and the links 23 are connected with the upper flexible support 27, consisting of a short chain provided at the lower end with an approximately U-shaped link or clip 28 having ears at opposite sides, which are pierced by the rivet 24. The upper end of the flexible connection is secured to an overhead beam 29, or other suitable support by a staple 30, piercing the beam and having threaded terminals for the reception of nuts 31.

What is claimed is:—

1. A stanchion comprising a lower flexible connection, sides or members hinged at their lower ends to the lower flexible connection, an upper flexible support in a vertical line with the lower flexible connection, a toggle having angle arms connected with the upper ends of the said sides or members, said toggle being connected with the upper flexible support, and a locking member arranged on the angle arms of the toggle and coacting therewith to retain the sides or members of the stanchion in their closed position.

2. A stanchion comprising a lower flexible connection, an upper flexible support, sides hinged at their lower ends to the lower flexible connection, overlapped angle levers extending in opposite directions and pivoted together at their angles, means for connecting the outer ends of the levers to the upper ends of the sides, and means for connecting the other ends of the angle levers to the upper flexible support.

3. A stanchion including sides or members hinged together at their lower ends, angle levers pivoted together at their angles and having lower arms connected with the upper ends of the said sides or members, links pivoted together at their upper ends and pivoted at their lower ends to the other arms of the angle levers and coacting therewith to form a toggle for opening and closing the sides or members, and means for locking the sides or members in their closed position.

4. A stanchion including sides or members hinged together at their lower ends, angle levers pivoted together at their angles and having lower arms provided with notches and pivoted to the upper ends of the sides or members, links located above the angle arms and pivoted together at their upper ends and connected at their lower ends with the other arms of the angle levers and coacting therewith to form a toggle, and a locking link slidable on the angle levers and arranged to engage the notches thereof for locking the sides or members in their closed position.

5. A stanchion comprising upper and lower flexible connections, sides or members pivoted at their lower ends to the lower flexible connection, plugs secured within the upper ends of the sides or members and provided with opposite longitudinal grooves and having transverse grooves at their inner ends, overlapped links arranged in the grooves of the said plugs and projecting beyond the upper ends of the sides or members, angle levers pivoted together at their angles and having lower arms connected to the projecting portions of the said links, upper links pivoted to the other arms of the angle levers and converging upwardly and pivoted together at their upper ends and to the upper flexible connection, and locking means for engaging the angle levers to secure the sides or members in their closed position.

In testimony, that we claim the foregoing as our own, we have hereto affixed our signatures in the presence of two witnesses.

NELS LOGAN.
HAAKON P. HANSON.

Witnesses:
ALFRED CHRISTOPHERSON,
A. S. OVERN.